United States Patent [19]

Matsuda et al.

[11] Patent Number: 5,106,170
[45] Date of Patent: Apr. 21, 1992

[54] HYDRAULIC BRAKING PRESSURE CONTROL SYSTEM

[75] Inventors: Shohei Matsuda; Jiro Suzuki; Ysuyoshi Satoh; Kazutoshi Tashima, all of Saitama, Japan

[73] Assignee: Honda Giken Kogyo Kabushiki Kaisha, Tokyo, Japan

[21] Appl. No.: 707,935

[22] Filed: May 28, 1991

Related U.S. Application Data

[63] Continuation of Ser. No. 538,041, Jun. 13, 1990, abandoned.

[30] Foreign Application Priority Data

Jun. 14, 1989 [JP] Japan .................. 1-150733

[51] Int. Cl.$^5$ .............................................. B60T 8/88
[52] U.S. Cl. .................. 303/92; 303/113 TR; 303/113 AP; 303/115 PP; 303/117
[58] Field of Search .......... 303/92, 113 AP, 113 TR, 303/117, 115 PP, 84.2

[56] References Cited

U.S. PATENT DOCUMENTS

| | | | |
|---|---|---|---|
| 4,175,794 | 11/1979 | Pauwels | 303/105 |
| 4,435,021 | 3/1984 | Hoenick | 303/117 X |
| 4,492,413 | 1/1985 | Belart et al. | 303/92 |
| 4,523,792 | 6/1985 | Belart et al. | 303/113 AP X |
| 4,648,663 | 3/1987 | Nomura et al. | 303/113 TR X |
| 4,768,843 | 9/1988 | Baughman et al. | 303/113 TR X |
| 4,826,258 | 5/1989 | Ocvirk et al. | 303/114 X |
| 4,869,560 | 9/1989 | Nishii | 303/116 X |
| 4,887,869 | 12/1989 | Nishii et al. | 303/114 |
| 4,938,541 | 6/1990 | Shaw et al. | 303/116 X |
| 4,940,291 | 6/1990 | Sato | 303/117 X |

FOREIGN PATENT DOCUMENTS

| | | |
|---|---|---|
| 1964926 | 7/1970 | Fed. Rep. of Germany . |
| 3505410 | 8/1986 | Fed. Rep. of Germany . |
| 3806227 | 9/1988 | Fed. Rep. of Germany . |
| 2116559 | 7/1972 | France . |
| 2538329 | 12/1983 | France . |
| 55-63944 | 5/1980 | Japan . |
| 61-102360 | 5/1986 | Japan . |
| 2064036 | 6/1981 | United Kingdom . |
| 2173269 | 10/1986 | United Kingdom . |
| 2189855 | 11/1987 | United Kingdom . |

*Primary Examiner*—Robert J. Oberleitner
*Assistant Examiner*—Lee W. Young
*Attorney, Agent, or Firm*—Armstrong & Kubovcik

[57] ABSTRACT

In a hydraulic braking pressure control system including an auxiliary hydraulic pressure generating unit capable of generating a hydraulic pressure in accordance with the braking operation of a brake pedal, and a hydraulic pressure supply source hydraulic pressure control unit interposed between a hydraulic pressure supply source and a brake device for controlling the hydraulic pressure from the hydraulic pressure supply source in accordance with the braking operation of the brake pedal, the hydraulic pressure chamber in the auxiliary hydraulic pressure generating unit is connected to the supply source hydraulic pressure control unit, so that the output hydraulic pressure therefrom is applied as a control pressure. When the hydraulic pressure from the hydraulic pressure supply source has been abnormally reduced, a braking pressure from the auxiliary hydraulic pressure generating unit is applied to the brake device in response to an opening of the on-off valve. During braking in a condition in which the hydraulic pressure from the hydraulic pressure supply source is normal, the operation of the hydraulic pressure regulating unit avoids the hydraulic pressure from the auxiliary hydraulic pressure generating unit from being applied to the brake device.

11 Claims, 3 Drawing Sheets

HYDRAULIC BRAKING PRESSURE CONTROL SYSTEM

This application is a continuation of application Ser. No. 538,041 filed June 13, 1990, now abandoned.

BACKGROUND OF THE INVENTION

1. Field of the Invention

The field of the present invention is hydraulic braking pressure control systems of the type having an auxiliary hydraulic pressure generating means capable of generating a hydraulic pressure in accordance with the braking operation of a brake pedal, and a hydraulic pressure supply source hydraulic pressure control means interposed between a hydraulic pressure supply source and brake devices for controlling the hydraulic pressure from the hydraulic pressure supply source in accordance with the braking operation of the brake pedal.

2. Description of the Prior Art

Such hydraulic braking pressure control systems are conventionally known, for example, from Japanese Patent Publication Kokoku No. 187/77.

The prior art system controls the braking pressure for the brake devices by the supply source hydraulic pressure control means. However, if the hydraulic pressure supply source is in malfunction or failure for any reasons, so that a sufficient hydraulic pressure from the hydraulic pressure supply source cannot be insured, then it is difficult to provide a sufficient braking pressure to the brake devices.

SUMMARY OF THE INVENTION

The present invention has been accomplished with such circumstances in view, and it is an object of the present invention to provide a hydraulic braking pressure control system which is designed to provide a sufficient braking pressure, even if the hydraulic pressure supply source is in malfunction or failure and a sufficient hydraulic pressure from the hydraulic pressure supply source cannot be insured.

To achieve the above object, according to a first feature of the present invention, the auxiliary hydraulic pressure generating means comprises a working piston which is slidably received in a first housing with a front surface of the working piston faced to a hydraulic pressure chamber and which is operatively connected to the brake pedal to advance in accordance with the braking operation of the brake pedal, and the hydraulic pressure supply source hydraulic pressure control means comprises a second housing having an output port connected to the brake device, an input port leading to the hydraulic pressure supply source, and a release port leading to a reservoir, a spool slidably received in the second housing to change-over the connection and disconnection of the output port with and from the input port and the release port by an axial movement of the spool, an input pressure working chamber defined in the second housing for exhibiting a hydraulic force for urging the spool in a direction to put the output port into communication with the input port, and an output pressure working chamber defined in the second housing and communicating with the output port to exhibit a hydraulic force in a direction to put the output port into communication with the release port, the hydraulic pressure chamber in the auxiliary hydraulic pressure generating means being connected to the input pressure working chamber in the supply source hydraulic pressure control means and also to the brake device through a hydraulic pressure regulating means which inhibits the flowing of a working fluid from the hydraulic pressure chamber until the output hydraulic pressure from the hydraulic pressure chamber in the auxiliary hydraulic pressure generating means exceeds a preset pressure, and through an on-off valve adapted to be opened in response to a reduction in an output hydraulic pressure from the output port, the preset pressure for the hydraulic pressure regulating means being set at a value not less than a hydraulic pressure in t he input pressure working chamber which is required for the supply source hydraulic pressure control means to be operated until the on-off valve can be closed by the output hydraulic pressure from the output port.

According to a second feature of the present invention, in addition to the construction of the first feature, the hydraulic pressure regulating means comprises a first one-way valve for permitting only the flowing of the working fluid from the hydraulic pressure chamber toward the on-off valve as the output hydraulic pressure in the hydraulic pressure chamber in the auxiliary hydraulic pressure generating means exceeds the preset pressure, and a second one-way valve connected in parallel to the first one-way valve to permit only the flowing of the working fluid from the on-off valve toward the hydraulic pressure chamber in the auxiliary hydraulic pressure generating means, and the auxiliary hydraulic pressure generating means is constructed such that the hydraulic pressure chamber is put into communication with the reservoir during a non-braking operation.

According to a third feature of the present invention, in addition to the construction of the second feature, a third one-way valve is interposed between the hydraulic pressure regulating means as well as the on-off valve and the reservoir for permitting only the flowing of the working fluid from the side of the reservoir.

Further, according to a fourth feature of the present invention, in addition to the construction of the third feature, a bar-like receiver is fixedly disposed in a cylindrical casing closed at opposite ends thereof to define, between the receiver and opposite ends of the casing, a first fluid chamber leading to the hydraulic pressure chamber in the auxiliary hydraulic pressure chamber and a second fluid chamber leading to the reservoir and to define, between the receiver and an inner surface of the casing, an annular third fluid chamber leading to the on-off valve, and the receiver has a cup seal fitted in an outer periphery of the receiver serving as the second one-way valve which is adapted to repulsively come into contact with the inner surface of the casing to establish and interrupt communication between the first and third fluid chambers, and a further cup seal fitted in an outer periphery of the receiver as the third one-way valve which is adapted to repulsively come into contact with the inner surface of the casing to establish and interrupt communication between the third and second fluid chambers, the first one-way valve being disposed midway of a passage provided in the receiver to interconnect the first and second fluid chambers.

With the construction of the first feature, during a normal braking where the hydraulic pressure from the hydraulic pressure supply source is normal, the supply source hydraulic pressure control means is operated in response to the output hydraulic pressure from the hydraulic pressure chamber in the auxiliary hydraulic pressure generating means, so that the hydraulic pressure delivered from the output port in the supply source hydraulic pressure control means is provided to the brake device. When the hydraulic pressure from the supply source has been abnormally reduced, the on-off valve can be opened in response to a reduction in output hydraulic pressure from the output port in the supply source hydraulic pressure control means, thereby permitting a hydraulic pressure delivered from the hydraulic pressure chamber in the auxiliary hydraulic pressure generating means to be applied to the brake device to insure a braking pressure. Moreover, the operation of the hydraulic pressure regulating means ensures that, during a braking operation in a condition in which the hydraulic pressure from the hydraulic pressure supply source is normal, the hydraulic pressure from the hydraulic pressure chamber in the auxiliary hydraulic pressure generating means cannot be applied to the on-off valve until the latter is closed, and the hydraulic pressure to be applied to the supply source hydraulic pressure control means and the hydraulic pressure to be applied to the brake device when the hydraulic pressure from the hydraulic pressure supply source is abnormally reduced can be delivered from the same hydraulic pressure chamber in the auxiliary hydraulic pressure generating means, leading to a reduction in size of the auxiliary hydraulic pressure generating means.

With the construction of the second feature, the hydraulic pressure regulating means can be formed in a simple construction and yet, the hydraulic pressure for the brake device can be escaped to the reservoir through the auxiliary hydraulic pressure generating means by means of the second one-way valve during a non-braking operation.

With the construction of the third feature, in breathing of the brake device, the working fluid from the reservoir can be drawn to the brake device by means of the third one-way valve.

Further, with the construction of the fourth feature, each of the first, second and third one-way valves can be formed into a compact construction.

The above and other objects, features and advantages of the invention will become apparent from a reading of the following detailed description of the preferred embodiment, taken in conjunction with the accompanying drawings.

BRIEF DESCRIPTION OF THE DRAWINGS

Drawings illustrate one embodiment of the present invention, wherein.

DESCRIPTION OF THE PREFERRED EMBODIMENTS

The present invention will now be described by way of one embodiment in which the present invention is applied to a hydraulic braking pressure control system for a front engine and front drive vehicle.

Figure 1:
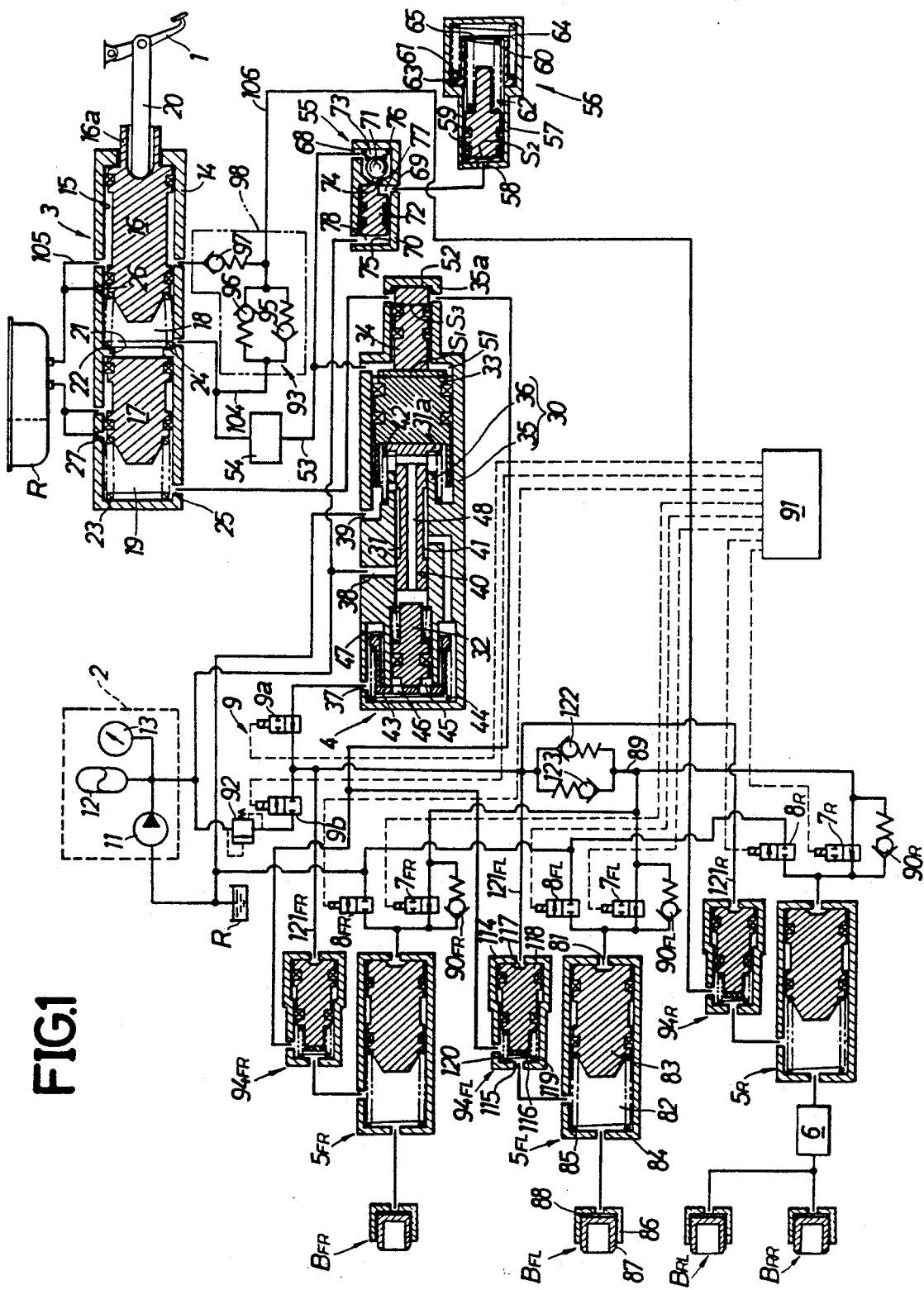
FIG. 1 is a hydraulic circuit diagram.

Referring first to FIG. 1, left and right front wheel brake devices $B_{FL}$ and $B_{FR}$ are mounted on left and right front wheels of the vehicle, respectively, and left and right rear wheel brake devices $B_{RL}$ and $B_{RR}$ are mounted on left and right rear wheels, respectively. An auxiliary hydraulic pressure generating means 3 is connected to a brake pedal 1 for generating a hydraulic pressure according to the amount of brake pedal 1 depressed, so that during a normal braking, a hydraulic pressure from a hydraulic pressure supply source 2 controlled by a hydraulic pressure supply source hydraulic pressure control means 4 in accordance with the hydraulic pressure generated from the auxiliary hydraulic pressure generating means 3 is provided to each of the front wheel brake devices $B_{FL}$ and $B_{FR}$ through each of hydraulic pressure transmitting means $5_{FL}$ and $5_{FR}$ and a hydraulic pressure from the supply source hydraulic pressure control means 4 is provided to each of the rear Wheel brake devices $B_{RL}$ and $B_{RR}$ through a hydraulic pressure transmitting means 5R and at proportional reducing valve 6. During braking when the hydraulic pressure supply source 2 is in malfunction or failure, the hydraulic pressure generated in the auxiliary hydraulic pressure generating means 3 is provided to each of the brake devices $B_{FL}$, $B_{FR}$, $B_{RL}$ and $B_{RR}$. Further, the hydraulic braking pressures for the brake devices $B_{FL}$, $B_{FR}$, $B_{RL}$ and $B_{RR}$ can be maintained or reduced for an anti-lock control by means of flow-in solenoid valves $7_{FL}$ and $7_{FR}$ and flow-out solenoid valves $8_{FL}$ and $8_{FR}$ mounted independently in association with the front wheel brake devices $B_{FL}$ and $B_{FR}$ as well as a flow-in solenoid valve $7_R$ and a flow-out solenoid valve $8_R$ mounted commonly for the rear wheel brake devices $B_{RL}$ and $B_{RR}$. Further, the hydraulic braking pressure for the brake devices $B_{FL}$ and $B_{FR}$ can be increased by a traction controlling change-over control valve means 9 to effect a traction control.

The hydraulic pressure supply source 2 comprises a hydraulic pump 11 for pumping a working fluid from a reservoir R, an accumulator 12 connected to the hydraulic pump and a pressure switch 13 for controlling the operation of the hydraulic pump 11.

The auxiliary hydraulic pressure generating means 3 includes a first cylindrically shaped housing 14 closed at its opposite ends. A first working piston 16 and a second working piston 17 disposed in front of the first piston 16 at a distance therefrom are slidably received in a first cylinder bore 15 provided in the housing 14. A first hydraulic pressure chamber 18 is defined between the first and second working pistons 16 and 17, and a second hydraulic pressure chamber 19 is defined between a front end wall of the first cylinder bore 15 and the second working piston 17.

The first working piston 16 is integrally provided with a piston rod 16a which fluid-tightly and movably extends through a rear end wall of the first cylinder bore 15 to project outwardly, and an urging rod 20 connected to the brake pedal 1 abuts at its front end against the piston rod 16a. Thus, the first working piston 16 is advanceable within the first cylinder bore 15 in response to the braking operation of the brake pedal 1.

A stop 21 is provided on an inner surface of the first cylinder bore 15 to project radially inwardly and adapted to abut against a rear end of the second working piston 17 to provide a retreat limit of the second working piston 17, and a first return spring 22 is mounted in compression between the stop 21 and the first working piston 16 for biasing the first working piston 16 rearwardly. A second return spring 23 is also mounted in compression between the front end wall of the first cylinder bore 15 and the second working piston 17 for biasing the second working piston 17 rearwardly. This permits the second working piston 17 to be advanced by the development of a hydraulic pressure in the first hydraulic pressure chamber 18 corresponding to the advancing movement of the first working piston 16. The preset load of the second return spring 23 is set such that the second working piston 17 is advanced after on-off valves $94_{FL}$ and $94_{FR}$ which will be described hereinafter have been closed by the hydraulic pressure from the supply source hydraulic pressure control means 4 which is operated in accordance with the hydraulic pressure in the first hydraulic pressure chamber 18.

The first housing 14 is provided with a first output port 24 leading to the first hydraulic pressure chamber 18, a second output port 25 leading to the second hydraulic pressure chamber 19, and communication ports 26 and 27 which permit the hydraulic pressure chambers 18 and 19 to communicate with the reservoir R only when the first and second working pistons 16 and 17 have been returned to their retreat limits.

The supply source hydraulic pressure control means 4 includes a second housing 30, a spool 31 slidably received in the second housing 30, a reaction piston 32, a first urging piston 33 and a second urging piston 34.

The second housing 30 comprises an outer cylindrical portion 35 closed at its opposite ends and an inner cylindrical portion 36 opened at its opposite ends and coaxially disposed within the outer cylindrical portion 35, the inner and outer cylindrical portions 36 and 35 being secured at their middle portions to each other. In a sequence from the front side to the rear side (from a left side to a right side as viewed in FIG. 1), provided in the outer cylindrical portion 35 at distances are an output port 37, an input port 38 leading to the hydraulic pressure supply source 2 and a release port 39 leading to the reservoir R. A second cylinder bore 40 is also provided in the inner cylindrical portion 36, and the input port 38 is opened in an inner surface of the second cylinder bore 40. Moreover, the spool 31 slidably received in the second cylinder bore 40 is provided at its outer surface with an annular recess 41. The recess 41 has a longitudinal length which is set such that when the spool 31 is in a rear position, the output port 37 and the release port 39 is put into communication with each other and when the spool 31 is in a front position, the output port 37 and the input port 38 is put into communication with each other.

The spool 31 is provided at its rear end with a collar 31a projecting radially outwardly, and a spring 42 is mounted in compression between the collar 31a and the second housing 30, so that the spool 31 is biased rearwardly by a spring force of the spring 42.

The reaction piston 32 is slidably received in the second cylinder bore 40 in the front position of the spool 31 so that it can abut against a front end of the spool 31. A hat-like member 43 is fitted around the inner cylindrical portion 36 at its front end and biased rearwardly by a spring force of a spring 44 which is mounted in compression between the hat-like member 43 and a front end wall of the outer cylindrical portion 35. An output pressure working chamber 45, to which a front end of the reaction piston 32 is faced, is defined between the hat-like member 43 and the reaction piston 32. The output pressure working chamber 45 communicates with the output port 37 through a communication hole 46 made in the hat-like member 43.

A spring 47 is mounted in compression between a step provided in an inner surface of the second cylinder bore 40 ahead of the spool 31 and the reaction piston 32, so that the reaction piston 32 is biased forwardly by a spring force of the spring 47. Moreover, the preset load of the spring 47 is set smaller than that of the spring 44, so that with no hydraulic pressure applied to the output pressure working chamber 45, the front end of the reaction piston 32 is in abutment against the hat-like member 43 which is biased by the spring 44 into abutment against the front end of the inner cylindrical portion 36.

A communication passage 48 is provided in the spool 31 to communicate with the release port 39 and opened in a front end face of the spool 31. Thus, any hydraulic pressure cannot be applied to a back of the reaction piston 32 and a front of the spool 31.

The first urging piston 3 is slidably received in the outer cylindrical portion 35 of the second housing 30 at a location close to its rear end behind the spool 31 to coaxially abut against the rear end of the spool 31. A smaller diameter portion 35a closed at its rear end is coaxially projectingly provided on the outer cylindrical portion 35 of the second housing 30 in the rear of the first urging piston 33, and the second urging piston 34 is slidably received in the smaller-diameter portion 35a to coaxially abut against a rear end of the first urging piston 33. A first input pressure working chamber 51 is defined between the first and second urging pistons 33 and 34, and a second input pressure chamber 52 is defined between a rear end wall of the smaller-diameter portion 35a and the second urging piston 34.

The supply source hydraulic pressure control means 4 permits the spool 31 to be axially moved by a balance between a hydraulic pressure rearwardly applied to the reaction piston 32 under the influence of the hydraulic pressure in the output hydraulic pressure chamber 45 and a hydraulic pressure forwardly applied to the first or second urging piston 33 or 34 under the influence of the hydraulic pressure in the first or second hydraulic pressure chamber 51 or 52, and that pressure-receiving area of the first urging piston 33 which is faced to the first input pressure working chamber 51 is set larger than that of the reaction piston 32 which is faced to the output pressure working chamber 45. This ensures that the spool 31 can be axially driven, even if the hydraulic pressure introduced into the first input pressure working chamber 51 is relatively low.

A hydraulic pressure passage 53 leading to the first input pressure working chamber 51 in the supply source hydraulic pressure control means 4 is connected through a proportional reducing valve 54 to the first output port 24 in the auxiliary hydraulic pressure generating means 3. The proportional reducing valve 54 is adapted to proportionally reduce the hydraulic pressure from the first output port 24 when it is equal to or more than a certain value, thereby permitting the reduced hydraulic pressure to be applied to the first input pressure working chamber 51, and has a conventionally well-known structure. Moreover, an accumulator 56 is connected to the hydraulic pressure passage 53 between the proportional reducing valve 54 and the first input pressure working chamber 51 through a shut-off valve 55.

The accumulator 56 comprises an accumulator body 57, an accumulator piston 59 slidably received in the body 57 to define an accumulating chamber 58 therebetween which is connected to the hydraulic pressure passage 53 through the shut-off valve 55, and first and second accumulator springs 60 and 61 interposed in series between the accumulator piston 59 and the accumulator body 57 to bias the accumulator piston 59 in a direction to reduce the volume of the accumulating chamber 58.

The accumulator body 57 is provided with a smaller diameter bore 62 closed at one end thereof and a larger diameter bore 64 axially connected at one end thereof to the other end of the smaller diameter bore 62 and closed at the other end thereof. The accumulator piston 59 is slidably received in the smaller diameter bore 62. Moreover, the accumulating chamber 58 is defined between one end of the accumulator piston 59 and the closed end of the smaller diameter bore 62. A spring receiving member 65 is axially movably contained in the larger diameter bore 64 and adapted to abut against a step 63 that limits the movement of the member 65 toward the one end of the larger diameter bore 64. The first accumulator spring 60 is mounted in a compressed manner between the accumulator piston 59 and the spring receiving member 65, while the second accumulator spring 61 is between the spring receiving member 65 and the other closed end of the larger diameter bore 64. Moreover, the preset load of the first accumulator spring 60 is set smaller than that of the second accumulator spring 61. Thus, in a condition of no hydraulic pressure applied to the accumulating chamber 58, the spring receiving member 65 is in abutment against the step 63 under the action of the spring force of the accumulator spring 62.

It should be noted that with the shut-off valve 55 opened, the hydraulic pressure developed in the first hydraulic pressure chamber 18 by the advancing movement of the first working piston 16 corresponding to the depression of the brake pedal 1 is reduced by the proportional reducing valve 54 and then accumulated in the accumulator 56 and applied to the first input pressure working chamber 51, but the operating pressure for the supply source hydraulic pressure control means 4 is set lower than the operating pressure for the accumulator 56, so that the operation of the supply source hydraulic pressure control means 4 is started before the operation of the accumulator 56. More specifically, if that pressure-receiving area of the first urging piston 33 of the supply source hydraulic pressure control means 4 which is faced to the first input pressure working chamber 51 is represented by $S_1$; that pressure-receiving area of the accumulator piston 59 which is faced to the accumulating chamber 58 is by $S_2$; the preset load of the spring 42 in the supply source hydraulic pressure control means 4 is by $f_1$; and the preset load of the accumulator spring 60 in the accumulator 56 is by $f_2$, the following expression (1) is established.

$$f_1/S_1 < f_2/S_2 \tag{1}$$

The shut-off valve 55 is arranged so that it is shut off when the hydraulic pressure of the hydraulic pressure supply source 2 has been abnormally reduced, and the valve 55 is interposed between the hydraulic pressure passage 53 leading from the proportional reducing valve 54 to the first input pressure working chamber 51 and the accumulating chamber 58 in the accumulator 56. The shut-off valve 55 is comprised of a valve sphere 71 which is contained in a shutoff valve body 70 having an inlet port 68 leading to the hydraulic pressure passage 53 and an outlet port 69 leading to the accumulating chamber 58. The valve sphere 71 is capable of establishing and cutting communication between the inlet port 68 and the outlet port 69, and a drive piston 72 is also contained in the valve body 70 for driving the valve sphere 71 for opening and closing thereof.

The shut-off valve body 70 is provided with a valve chest 73 leading to the inlet port 68, a valve bore 74 communicating at its middle portion with the outlet port 69, and a slide bore 75 in which the drive piston 72 is slidably received, the valve chest 73, the valve bore 74 and the slide bore 75 being axially connected to one another. A tapered valve seat is formed at that end edge of the valve bore 74 which is opened into the valve chest 73, and the valve sphere 71 seatable on the valve seat to close the valve bore 74 is contained in the valve chest 73 for opening and closing operation. Further, a spring 76 is contained in the valve chest 73 for biasing the valve sphere 71 in a valve-closing direction.

The drive piston 72 is slidably received in the slide bore 75 with one end face of the piston faced to an output chamber 77 leading to the valve bore 74 and the other end face of the piston faced to a back pressure chamber 78. The drive piston 72 has a smaller diameter drive shaft portion which is integrally provided thereon to project therefrom and loosely passes through the valve bore 74 to abut against the valve sphere 71. Moreover, the length of the drive shaft portion is set such that the movement of the drive piston 72 in a direction to reduce the volume of the output chamber 77 permits the valve sphere 71 to be moved away from the valve seat to open the valve bore 74. The hydraulic pressure supply source 2 is connected to the back pressure chamber 78. Thus, in a condition in which the hydraulic pressure supply source 2 is in a normal operation, the shutoff valve 55 is open, and in response to an abnormal reduction in output hydraulic pressure from the hydraulic pressure supply source 2, the shut-off valve 55 is closed.

The hydraulic pressure transmitting means $5_{FL}$, $5_{FR}$ and $5_R$ are provided between the output port 37 in the supply source hydraulic pressure control means 4 and the brake devices $B_{FL}$, $B_{FR}$, $B_{RL}$ and $B_{RR}$. The hydraulic pressure transmitting means $5_{FL}$ and $5_{FR}$ are interposed between a normally-opened solenoid valve 9a of the traction controlling change-over control valve means 9 connected to the output port 37 in the supply source hydraulic pressure control means 4 and the brake devices $B_{FL}$ and $B_{FR}$, while the hydraulic pressure transmitting means $5_R$ is interposed between the normally-opened solenoid valve 9a and the proportional reducing valve 6 connected to the brake devices $B_{RL}$ and $B_{RR}$. These hydraulic pressure transmitting means $5_{FL}$, $5_{FR}$ and $5_R$ function to transmit the hydraulic pressure from the supply source hydraulic pressure control means 4 to each of the brake devices $B_{FL}$, $B_{FR}$, $B_{RL}$ and $B_{RR}$ when such hydraulic pressure is normal, and to inhibit a back flow of the working fluid from each of the brake devices $B_{FL}$, $B_{FR}$, $B_{RL}$ and $B_{RR}$ toward the hydraulic pressure supply source 2 when the hydraulic pressure from the hydraulic pressure supply source 2 has been abnormally reduced. They have a basically same construction and hence, the construction of representative one $5_{FL}$ of these hydraulic pressure transmitting means will be described below.

The hydraulic pressure transmitting means $5_{FL}$ is comprised of a free piston 83 slidably received in a cylinder body 84 with opposite ends of the piston 83 being faced to input and output hydraulic pressure chambers 81 and 82 respectively, and a spring 85 disposed and contained in the output hydraulic pressure chamber 82 for biasing the free piston 83 toward the input hydraulic pressure chamber 81.

With such a construction of the hydraulic pressure transmitting means $5_{FL}$, it is possible to deliver the hydraulic pressure from the output hydraulic pressure chamber 82 in accordance with the hydraulic pressure applied to the input hydraulic pressure chamber 81, wherein the hydraulic pressure in the output hydraulic pressure chamber 82 cannot flow toward the input hydraulic pressure chamber 81. The output hydraulic pressure chamber 82 is connected to the brake device $B_{FL}$.

More specifically, each of the brake devices $B_{FL}$, $B_{FR}$, $B_{RL}$ and $B_{RR}$ comprises a cylinder body 86 and a braking piston 87 slidably received in the cylinder body 86, so that a braking force is exhibited by the movement of the braking piston 87 in accordance with the hydraulic pressure applied to a hydraulic braking pressure chamber 88 defined between the cylinder body 86 and the braking piston 87. The output hydraulic pressure chamber 82 communicates with the hydraulic braking pressure chamber 88.

The flow-in solenoid valves $7_{FL}$ and $7_{FR}$ and the flow-out solenoid valves $8_{FL}$ and $8_{FR}$ are connected in parallel to the input hydraulic pressure chambers 81 of the hydraulic pressure transmitting means $5_{FL}$ and $5_{FR}$ associated with the front wheel brake devices $B_{FL}$ and $B_{FR}$, respectively, while the flow-in solenoid valve $7_R$ and the flow-out solenoid valve $8_R$ are connected in parallel to the input hydraulic pressure chamber 81 of the hydraulic pressure transmitting means $5_R$ associated with the rear wheel brake devices $B_{RL}$ and $B_{RR}$.

The flow-in solenoid valves $7_{FL}$, $7_{FR}$ and $7_R$ are solenoid valves which are shut off when excited, while the flow-out solenoid valves $8_{FL}$, $8_{FR}$ and $8_R$ are solenoid valves which are opened when excited. The flow-out solenoid valves $8_{FL}$, $8_{FR}$ and $8_R$ are interposed between the input hydraulic pressure chambers 81 in the hydraulic pressure transmitting means $5_{FL}$, $5_{FR}$ and $5_R$ and the reservoir R, respectively. The flow-in solenoid valves $7_{FL}$, $7_{FR}$ and $7_R$ are interposed between the input hydraulic pressure chambers 81 in the hydraulic pressure transmitting means $5_{FL}$, $5_{FR}$ and $5_R$ and an output hydraulic pressure passage 89, respectively. Further, in parallel to the corresponding flow-in solenoid valves $7_{FL}$, $7_{FR}$ and $7_R$, one-way valves $90_{FL}$, $90_{FR}$ and $90_R$ for releasing the hydraulic pressure are connected to the input hydraulic pressure chamber 82 for permitting only the flow of the working fluid from the input hydraulic pressure chambers 81 toward the output hydraulic pressure passage 89.

The excitation and deexcitation of the flow-in solenoid valves $7_{FL}$, $7_{FR}$ and $7_R$ and the flow-out solenoid valves $8_{FL}$, $8_{FR}$ and $8_R$ are controlled by a control means 91 such that it controls the flow-in solenoid valves $7_{FL}$, $7_{FR}$ and $7_R$ and the flow-out solenoid valves $8_{FL}$, $8_{FR}$ and $8_R$ to keep all of them deexcited during a normal braking, but to provide a change-over, during an anti-lock control, among a pressure-reduced control condition in which all of the flow-in solenoid valves $7_{FL}$, $7_{FR}$ and $7_R$ and the flow-out solenoid valves $8_{FL}$, $8_{FR}$ and $8_R$ are excited, a pressure-maintained control condition in which the flow-in solenoid valves $7_{FL}$, $7_{FR}$ and $7_R$ are excited and at the same time, the flow-out solenoid valves $8_{FL}$, $8_{FR}$ and $8_R$ are deexcited, and a pressure-increased control condition in which all of the flow-in solenoid valves $7_{FL}$, $7_{FR}$ and $7_R$ and the flow-out solenoid valves $8_{FL}$, $8_{FR}$ and $8_R$ are deexcited.

The traction-controlling change-over control valve means 9 is comprised of a normally-opened solenoid valve $9a$ interposed between the output port 37 in the supply source hydraulic pressure control means 4 and the output hydraulic passage 89, and a normally-closed solenoid valve $9b$ interposed between the hydraulic pressure supply source 2 and the output hydraulic pressure passage 89. The excitation and deexcitation of the solenoid valves $9a$ and $9b$ are also controlled by the control means 91 such that the means 91 controls the solenoid valves $9a$ and $9b$ to deexcite the solenoid valve $9a$ to maintain it opened and deexcite the solenoid valve $9b$ to maintain it closed in a normal condition, and to excite the solenoid valve $9a$ to close it and excite the solenoid valve $9b$ to open it during an anti-lock control. Further, the control means 91 is also capable of controlling the change-over between the excitation and deexcitation of the solenoid valve $9a$ in a pressure-increased condition during an anti-lock control, i.e., in a condition in which all of the flow-in solenoid valves $7_{FL}$, $7_{FR}$ and $7_R$ and the flow-out solenoid valves $8_{FL}$, $8_{FR}$ and $8_R$ are deexcited.

The solenoid valve $9b$ in the traction-controlling change-over control valve means 9 is connected to the hydraulic pressure supply source 2 through a constant differential pressure type reducing valve 92. This ensures that during opening of the solenoid valve $9b$, the working fluid from the hydraulic pressure supply source 2 is reduced in pressure through the reducing valve 92 and supplied to the output hydraulic pressure passage 89.

The proportional reducing valve 6 has a conventionally well-known structure and serves to proportionally reduce the hydraulic pressure delivered from the output hydraulic pressure chamber 82 in the hydraulic pressure transmitting means $5_R$ when it is equal to or more than a certain value, thereby applying the reduced hydraulic pressure to the hydraulic braking pressure chambers 88 in the rear wheel brake devices $B_{RL}$ and $B_{RR}$.

The first output port 24 in the auxiliary hydraulic pressure generating means 3 is connected to the first input pressure working chamber 51 in the supply source hydraulic pressure control means 4 through the proportional reducing valve 54, while the second output port 25 is connected to the second input pressure working chamber 52 in the supply source hydraulic pressure control means 4. Thus, the hydraulic pressure in the second hydraulic pressure chamber 19 is delivered at an intact level to the second input pressure working chamber 52, whereas the hydraulic pressure in the first hydraulic pressure chamber 18 is delivered at a reduced level to the first input hydraulic pressure working chamber 51. Therefore, if that pressure-receiving area $S_3$ of the second urging piston 34 which is faced to the second input pressure working chamber 52 is set larger than that pressure-receiving area $S_1$ of the first urging piston 33 which is faced to the first input pressure working chamber 51, the effect of reducing the pressure by the proportional reducing valve 54 is not provided and hence, the pressure-receiving area $S_3$ of the second urging piston 34 is set smaller than the pressure-receiving area $S_1$ of the first urging piston 33 to such an extent that the pressure reducing effect by the proportional reducing valve 54 is not invalidated thereby.

The first output port 24 is connected to the first input pressure working chamber 51 through the proportional reducing valve 54 and also to the rear wheel brake devices $B_{RL}$ and $B_{RR}$ through an on-off valve $94_R$ adapted to be opened in response to a reduction in output hydraulic pressure from the output port 37 and through the proportional reducing valve 6. The second output port 25 is connected to the second input pressure working chamber 52 and also to the left and right front wheel brake devices $B_{FL}$ and $B_{FR}$ through on-off valves $94_{FL}$ and $94_{FR}$ adapted to be opened in response to a reduction in output hydraulic pressure from the output port 37.

A hydraulic pressure regulating means 93 comprises a first one-way valve 95 which permits only the flowing of the working fluid from the first hydraulic pressure chamber 18 toward the on-off valve $94_R$ in response to the output hydraulic pressure in the first hydraulic pressure chamber 18 in the auxiliary hydraulic pressure generating means 3 exceeding a preset pressure $P_1$, and a second one-way valve 96 connected in parallel to the first one-way valve 95 and permitting only the flowing of the working fluid from the side of the on-off valve $94_R$ toward the first hydraulic pressure chamber 18. Half-way between the hydraulic pressure regulating means 93 and this on-off valve $94_R$ is connected to the reservoir R through a third one-way valve 97 which permits only the flowing of the working fluid from the reservoir R toward the on-off valve $94_R$.

Figure 2:
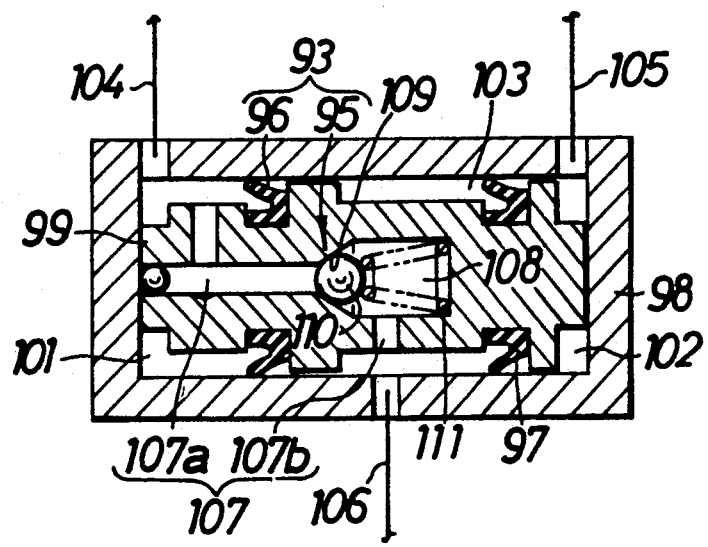
FIG. 2 is a sectional view showing constructions of first, second and third one-way valves.

The one-way valves 95, 96 and 97 are disposed within a common casing 98, as shown in FIG. 2. More specifically, a bar-like receiver 99 is fixedly disposed within the cylindrically shaped casing 98 closed at its opposite ends, and a cup seal serving as the second one-way valve 96 adapted to repulsively come into contact with an inner surface of the casing 98 and another cup seal serving as the third one-way valve 97 are fitted in an outer surface of the receiver 99 at an axial distance therebetween.

A first fluid chamber 101 is defined between one of the closed ends of the casing 98 and the receiver 99, and a second fluid chamber 102 is defined between the other closed end of the casing 98 and the receiver 99. Additionally, between the one-way valves 96 and 97, a third annular fluid chamber 103 is defined between the outer surface of the receiver 99 and the inner surface of the casing 98. The first fluid chamber 101 communicates with the auxiliary hydraulic pressure generating means 3 through a fluid passage 104, while the second fluid chamber 102 communicates with the reservoir R through a fluid passage 105. The third fluid chamber 103 is connected to the on-off valve $94_R$ through a fluid passage 106.

The receiver 99 is provided with a passage 107 which connects the first fluid chamber 101 and the third fluid chamber 103 to each other, and the first one-way valve 95 is disposed at the middle of the passage 107, i.e., between a portion 107a of the passage 107 on the side of the first fluid chamber 101 and a portion 107b on the side of the third fluid chamber 103. The first one-way valve 95 is comprised of a valve chest 108 provided in the receiver 99 to communicate with the portion 107b of the passage 107 on the side of the third fluid chamber 103, a valve sphere 110 contained in the valve chest 108 so as to be able to seat on a tapered valve seat 109 provided at that end edge of the portion 107a of the passage 107 on the side of the first fluid chamber 101 which is opened into the valve chest 108, and a spring 111 contained in the valve chest 108 for biasing the valve sphere 110 in a direction to seat on the valve seat 109.

Figure 3:
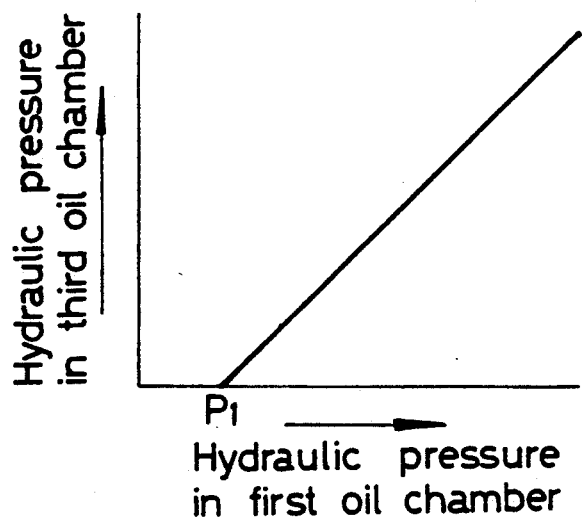
FIGS. 3, 4 and 5 are graphs illustrating preset pressures for opening the first, second and third one-way valves, respectively.

In the first one-way valve 95, a hydraulic pressure in the portion 107a of the passage 107 on the side of the first fluid chamber 101, i.e., a hydraulic pressure in the first hydraulic pressure chamber 18 in the auxiliary hydraulic pressure generating means is applied to the valve sphere 110 in a valve-opening direction, and a spring force of the spring 111 acts on the valve sphere in a valve-closing direction. Thus, the first one-way valve 95 is opened when the hydraulic pressure in the first fluid chamber 101, i.e., in the hydraulic pressure chamber 18 has exceeded the preset pressure $P_1$, thereby permitting only the flowing of the working fluid from the first hydraulic pressure chamber 18 toward the on-off valve $94_R$, as shown in FIG. 3. The preset pressure $P_1$ is set at a value more than that hydraulic pressure in the first input pressure working chamber 51 which is required for the supply source hydraulic pressure control means 4 to be operated until the on-off valve $94_R$ can be opened by the output hydraulic pressure from the output port 37 in the supply source hydraulic pressure control means 4.

Figure 4:
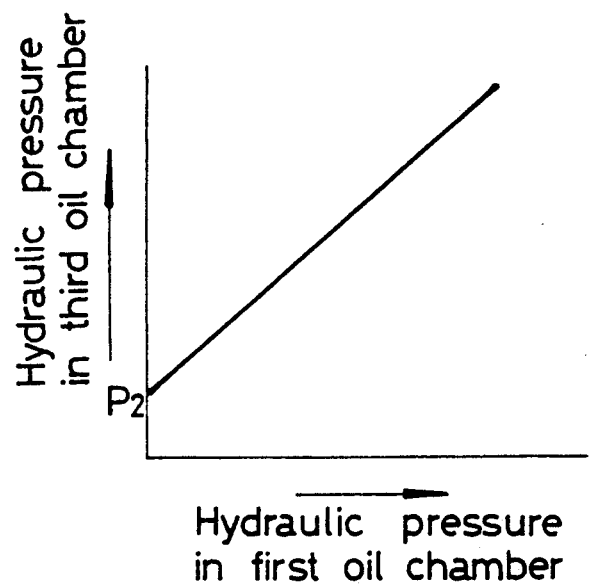
Figure 5:
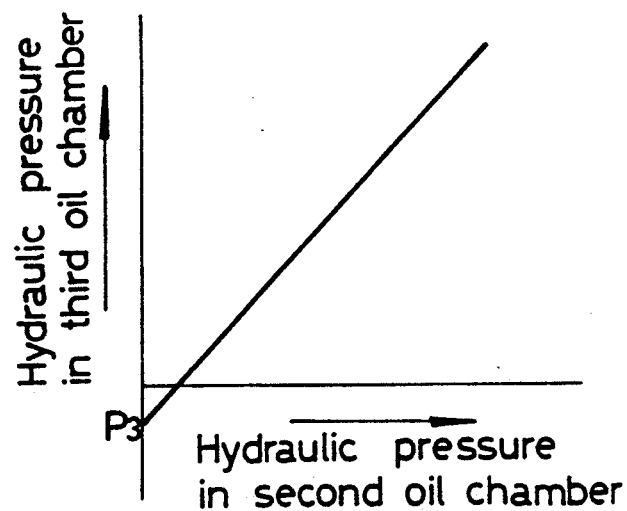

The second one-way valve 96 serves to escape the hydraulic pressure in the hydraulic braking pressure chambers 88 in the rear brake devices $B_{RL}$ and $B_{RR}$ through the proportional reducing valve 6, the on-off valve $94_R$ and the first hydraulic pressure chamber 18 in a condition in which the first working piston 16 of the auxiliary hydraulic pressure generating means 3 has been returned to its retreat limit upon the completion of the braking operation to put the first hydraulic pressure chamber 18 into communication with the reservoir R through the communication port 26. The second one-way valve 96 is opened at a preset pressure $P_2$ as shown in FIG. 4 to permit the flowing of the working fluid from the third fluid chamber 103 toward the first fluid chamber 101. The preset pressure $P_2$ is set such that no dragging occurs in the brake device $B_{RL}$ and $B_{RR}$, even if the hydraulic pressure corresponding to the preset pressure $P_2$ is applied to the hydraulic braking pressure chambers 88.

The third one-way valve 97 serves to permit the flowing of the working fluid from the reservoir R toward the hydraulic braking pressure chambers 88 in the rear brake devices $B_{RL}$ and $B_{RR}$ in order to enable the hydraulic braking pressure chambers 88 to breathe by a variation in temperature or the like in a condition in which the first working piston 16 of the auxiliary hydraulic pressure generating means 3 has been returned to its retreat limit upon the completion of the braking operation to put the first hydraulic pressure chamber 18 into communication with the reservoir R through the communication port 26. A preset pressure $P_3$ set in the third one-way valve 97 may be set at a level such that the hydraulic braking pressure chambers 88 is kept from being brought into a negative pressure condition.

The on-off valves $94_{FL}$, $94_{FR}$ and $94_R$ have the same construction and hence, only the construction of the on-off valve $94_{FL}$ will be described below.

The on-off valve $94_{FL}$ comprises a cylindrical on-off valve body 114 closed at its opposite ends, a valve port 115 made in one end wall of the on-off valve body 114 to communicate with the output hydraulic pressure chamber 82 in the hydraulic pressure transmitting means $5_{FL}$, an opening and closing piston 118 slidably received in the on-off valve body 114 while having at one end a valve member 116 capable of closing the valve port 115 and having the other end faced to a pilot chamber 117, and a spring 119 interposed between the on-off valve body 114 and the opening and closing piston 118 to bias the piston 118 toward the pilot chamber 117.

A valve chest 120 is defined between the one end wall of the on-off valve body 114 and the opening and closing piston 118 and capable of communicating with the valve port 115, and the spring 119 is contained in the valve chest 120. In addition, the valve chest 120 communicates with the second output port 25 in the auxiliary hydraulic pressure generating means 3.

With such an on-off valve $94_{FL}$, when the hydraulic pressure in the pilot chamber 117 is lower than a given value, the valve $94_{FL}$ is open with the valve member 116 moved to a position to open the valve port 115 and with the opening and closing piston 118 moved toward the pilot chamber 117. When the hydraulic pressure in the pilot chamber 117 is equal to or more than the given value, the opening and closing piston 118 is moved leftwardly, so that the valve port 115 is closed by the valve member 116 to close the on-off valve.

A branch fluid passage $121_{FL}$ branched from the output hydraulic pressure passage 89 is connected to the pilot chamber 117. Thus, when the hydraulic pressure in the branch fluid passage $121_{FL}$ and thus in the pilot chamber 117 is high, the on-off valve $94_{FL}$ is closed to put the second output port 25 and the brake device $B_{FL}$ out of communication with each other. When the hydraulic pressure in the branch fluid passage $121_{FL}$ is reduced, the on-off valve $94_{FL}$ is opened to put the second output port 25 and the brake device $B_{FL}$ into communication with each other.

In addition, when the hydraulic pressure in the branch fluid passage $121_{FR}$ branched from the output fluid passage 89 is high, the on-off valve $94_{FR}$ is closed to put the second output port 25 and the brake device $B_{FR}$ out of communication with each other, and when the hydraulic pressure in the branch fluid passage $121_{FR}$ is low, the on-off valve $94_{FR}$ is opened to put the second output port 25 and the brake device $B_{FR}$ into communication with each other. Further, when the hydraulic pressure in the branch fluid passage $121_R$ branched from the output hydraulic pressure passage 89 is high, the on-off valve $94_R$ is closed, thereby permitting the hydraulic pressure regulating means 93 and the brake devices $B_{RL}$ and $B_{RR}$ to be put out of communication with each other, and when the hydraulic pressure in the branch fluid passage $121_R$ is reduced, the on-off valve $94_R$ is opened, thereby permitting the hydraulic pressure regulating means 93 and the brake devices $B_{RL}$ and $B_{RR}$ to be put into communication with each other.

A fourth one-way valve 122 is provided in the output hydraulic pressure passage 89 at a place closer to the hydraulic pressure transmitting means $5_{FL}$, $5_{FR}$ and $5_R$ than branched points of the branch fluid passages $121_{FL}$, $121_{FR}$ and $121_R$. The fourth one-way valve 122 is adapted to be opened in response to a differential pressure equal to or more than a preset value to permit only the flowing of the working fluid from the side of the output port 37 toward the hydraulic pressure transmitting means $5_{FL}$, $5_{FR}$ and $5_R$.

A fifth one-way valve 123 is connected in parallel to the fourth one-way valve 122. The fifth one-way valve 123 is adapted to be opened in response to a differential pressure equal to or greater than a preset value to permit only the flowing of the working fluid from the side of the hydraulic pressure transmitting means $5_{FL}$, $5_{FR}$ and $5_R$ toward the output port 37. The preset value for opening the fifth one-way valve 123 is set smaller than the preset value for opening the fourth one-way valve 122.

The operation of this embodiment will be described below. First, suppose that a normal braking operation is being effected in a condition in which the hydraulic pressure supply source 2 is normally operative, the flow-in solenoid valves $7_{FL}$, $7_{FR}$ and $7_R$ and the flow-out solenoid valves $8_{FL}$, $8_{FR}$ and $8_R$ are in their deexcited states (states as shown in FIG. 1), and the solenoid valves $9a$ and $9b$ of the traction-controlling change-over control valve means 9 are also in their deexcited states (states as shown in FIG. 1) and further, the shut-off valve 55 is open as a result of the hydraulic pressure from the hydraulic pressure supply source 2 having been applied to the back pressure chamber 78. Thus, the output port 37 in the supply source hydraulic pressure control means 4 is in communication with the output hydraulic pressure passage 89 which is in communication with the input hydraulic pressure chambers 81 in the hydraulic pressure transmitting means $5_{FL}$, $5_{FR}$ and $5_R$ through the flow-in solenoid valves $7_{FL}$, $7_{FR}$ and $7_R$. The first output port 24 in the auxiliary hydraulic pressure generating means 3 is in communication with the first input pressure working chamber 51 in the supply source hydraulic pressure control means 4 and the accumulator 56 through the proportional reducing valve 54, and the second output port 25 is in communication with the second input pressure working chamber 52.

If the brake pedal 1 is depressed in such a condition, the first working piston 16 in the auxiliary hydraulic pressure generating means 3 is advanced, so that the hydraulic pressure developed in the first hydraulic pressure chamber 18 is reduced by the proportional reducing valve 54 and then applied to the first input pressure working chamber 51 and also to the accumulating chamber 58 in the accumulator 56. In this case, the supply source hydraulic pressure control means 4 is set up to start its operation earlier than the accumulator 56. More specifically, that pressure-receiving area $S_1$ of the first urging piston 33 in the supply source hydraulic pressure control means 4 which is faced to the input hydraulic pressure chamber 51, that pressure-receiving area $S_2$ of the accumulator piston 59 which is faced to the accumulating chamber 58, the preset load $f_1$ of the spring 42 in the supply source hydraulic pressure control means 4 and the preset load $f_2$ of the first accumulator spring 60 in the accumulator 56 are set so that the inequality indicated by the above-described expression (1) is established.

In the supply source hydraulic pressure control means 4, this permits the first urging piston 33 to be advanced before the accumulator 56 is operated for accumulation, and the spool 31 with the rear end in abutment against the urging piston 33 is driven to be advanced. The starting of the operation of the supply source hydraulic pressure control means 4 prior to the operation of the accumulator 56 for accumulation ensures that the generation of a wasteful reaction force can be avoided during braking, and any loss in depressing force to the brake pedal 1 can be prevented, thus improving the responsibility.

In the supply source hydraulic pressure control means 4, at the time when the spool 31 has been advanced by a certain distance as the first urging piston 33 has been advanced, the output port 37 is put into communication with the input port 38, so that the output hydraulic pressure from the output port 37 communicating with the hydraulic pressure supply source 2 is rapidly increased. The on-off valves $94_{FL}$, $94_{FR}$ and $94_R$ are first closed in response to increasing of the hydraulic pressure in the branch fluid passages $121_{FL}$, $121_{FR}$ and $121_R$ before the differential pressure across the fourth one-way valve 122 in the output hydraulic pressure passage 89 reaches the preset valve-opening pressure. The, the fourth one-way valve 122 is opened, as that differential pressure becomes equal to or greater than the preset valve-opening pressure. This causes the hydraulic pressure from the output port 37 to be applied to the input hydraulic pressure chambers 81 in the hydraulic pressure transmitting means $5_{FL}$, $5_{FR}$ and $5_R$ through the output hydraulic pressure passage 89 and the flow-in solenoid valves $7_{FL}$, $7_{FR}$ and $7_R$, thereby achieving a braking pressure in the brake devices $B_{FL}$ and $B_{FR}$, while at the same time causing the hydraulic pressure delivered from the output hydraulic pressure chamber 82 in the hydraulic pressure transmitting means $5_R$ to be reduced by the proportional reducing valve 6 and applied to the rear wheel brake devices $B_{RL}$ and $B_{RR}$. Therefore, during braking, the on-off valves $94_{FL}$, $94_{FR}$ and $94_R$ can be reliably closed before the operation of the hydraulic pressure transmitting means $5_{FL}$, $5_{FR}$ and $5_R$, and the braking force can be increased concurrently with the operation of the hydraulic pressure transmitting means $5_{FL}$, $5_{FR}$ and $5_R$ to improve the responsibility.

Moreover, the rapid increasing of the output hydraulic pressure from the output port 37 ensures that play at the individual parts to the brakes devices $B_{FL}$, $B_{FR}$, $B_{RL}$ and $B_{RR}$ are eliminated by supplying of a relatively high hydraulic pressure, and the initial operation of the braking pistons 87 in the brake devices $B_{FL}$, $B_{FR}$, $B_{RL}$ and $B_{RR}$ are smoothed.

At the time when the on-off valves $94_{FL}$, $94_{FR}$, and $94_R$ have been closed by the hydraulic pressure from the output port 37, the first one-way valve 95 in the hydraulic pressure regulating means 93 is opened, thereby permitting the hydraulic pressure from the first hydraulic pressure chamber 18 in the auxiliary hydraulic pressure generating means 3 to be applied to the inlet side of the on-off valve $94_R$, and the advancing movement of the second working piston 17 in the auxiliary hydraulic pressure generating means 3 is started, thereby causing the hydraulic pressure developed in the second hydraulic pressure chamber 19 to be applied to the inlet sides of the on-off valves $94_{FL}$ and $94_{FR}$. However, because the on-off valves $94_{FL}$, $94_{FR}$ and $94_R$ have been already closed, the hydraulic pressure in the first and second hydraulic pressure chambers 18 and 19 cannot be applied to the brake devices $B_{FL}$, $B_{FR}$, $B_{RL}$ and $B_{RR}$.

The communication of the output port 37 with the input port 38 causes the hydraulic pressure in the output pressure working chamber 45 to be also increase, so that the reaction piston 32 is driven rearwardly to abut against the front end of the spool 31, whereby the spool 31 is retreated to put the output port 37 and the input port 38 out of communication with each other. As the hydraulic pressure in the first hydraulic pressure chamber 18 is increased by further depressing the brake pedal 1, the spool 31 is advanced again to put the output port 37 into communication with the input port 38. In this way, in response to the braking operation of the brake pedal 1, the spool 31 is reciprocally moved between the front position in which the output port 37 is put into communication with the input port 38 and the rear position in which the communication between the output port 37 and the input port 38 is cut off, whereby the hydraulic pressure from the hydraulic pressure supply source 2 is controlled in accordance with the amount of brake pedal 1 depressed for braking and is delivered from the output port 37.

In this manner, the hydraulic pressure from the hydraulic pressure supply source 2 can be controlled, in accordance with the amount of brake pedal depressed, by the supply source hydraulic pressure control means 4 and then applied to the individual brake devices $B_{FL}$, $B_{FR}$, $B_{RL}$ and $B_{RR}$, and because the brake devices $B_{FL}$, $B_{FR}$, $B_{RL}$ and $B_{RR}$ and the hydraulic circuit from the input hydraulic pressure chamber 81 to the hydraulic pressure supply source 2 are isolated from each other by the free pistons 83 in the hydraulic pressure transmitting means $5_{FL}$, $5_{FR}$ and $5_R$, a gas which may be possibly incorporated into the working fluid in the hydraulic pressure supply source 2 cannot adversely affect the brake devices $B_{FL}$, $B_{FR}$, $B_{RL}$ and $B_{RR}$.

During such braking, the braking force for the left and right rear wheels need to be lower than that for the left and right front wheels and is reduced at a given proportion to a lower level than that for the left and right front wheels, as a result of the hydraulic pressure from the supply source hydraulic pressure control means 4 having been reduced by the proportional reducing valve 6.

In addition, because the hydraulic pressure in the first hydraulic pressure chamber 18 is applied to the first input pressure working chamber 51 through the proportional reducing valve 54, the hydraulic pressure applied to the first input pressure working chamber 51 and the accumulator 56 can be suppressed to a lower level in the higher pressure region after the braking force had been sufficiently exhibited, and this contributes to a reduction in load of the supply source hydraulic pressure control means 4 and the accumulator 56. Moreover, by reducing the hydraulic pressure in the first hydraulic pressure chamber 18 by the proportional reducing valve 54 to apply it to the first input pressure working chamber 51 when the brake pedal 1 has been depressed several times to a depth falling within a range of play, the frequency of increasing of the hydraulic pressure downstream of the supply source hydraulic pressure control means 4 can be restrained to a small level, thereby reducing the amount of working fluid circulated to suppress a wasteful consumption of the working fluid, while restraining the frequency of operations of the free pistons 83 in the hydraulic pressure transmitting means $5_{FL}$ to $5_R$ to contribute to an improvement in durability.

Further, accumulation of the hydraulic pressure from the first hydraulic pressure chamber 18 by the accumulator 56 insures a pedal stroke for the brake pedal 1, resulting in no need for a construction for insuring the pedal stroke in the supply source hydraulic pressure control means 4, thereby enabling a reduction in size of the supply source hydraulic pressure control means 4. Moreover, when a sudden reaction force acts, the direct application thereof to the brake pedal 1 can be avoided by a damper effect by the accumulator 56.

When the depressing force for the brake pedal 1 becomes too large during such braking and the wheel(s) is about to become locked, the flow-in solenoid valve $7_{FL}$, $7_{FR}$, $7_R$ associated with the wheel which is about to become locked is excited to cut off the communication between the output hydraulic pressure passage 89 and the hydraulic pressure transmitting means $5_{FL}$, $5_{FR}$, $5_R$. This causes the increasing of the braking force to be suppressed to avoid that the wheel is about to become locked. Nevertheless, when the wheel is about to be brought into its locked state, the tendency of locking of the wheel can be eliminated by exciting the associated flow-out solenoid valve $8_{FL}$, $8_{FR}$, $8_R$ to put the input hydraulic pressure chamber 81 in the hydraulic pressure transmitting means $5_{FL}$, $5_{FR}$, $5_R$ into communication with the reservoir R, thereby reducing the braking force.

After elimination of the above locking tendency, the flow-in solenoid valve $7_{FL}$, $7_{FR}$, $7_R$ is deexcited and at the same time, the flow-out solenoid valve $8_{FL}$, $8_{FR}$, $8_R$ is deexcited. This permits the hydraulic pressure from the output port 37 in the supply source hydraulic pressure control means 4 to be applied again to the hydraulic pressure transmitting means $5_{FL}$, $5_{FR}$, $5_R$ to increase the braking force.

By intermittent control of the operation of the solenoid valve 9a in the traction-controlling change-over control valve means 9 during increasing of the pressure in such an anti-lock control condition, it is possible to more precisely effect the anti-lock control for both the front wheels. Specifically, intermittent closing of the solenoid valve 9a ensures that any sudden application of the hydraulic pressure from the output port 37 to each of the flow-in solenoid valves $7_{FL}$, $7_{FR}$ and $7_R$ can be avoided to provide a smooth increasing of the hydraulic pressure. In addition, when the anti-lock control is being effected for one of the left and right front wheel in a condition that these wheels are travelling on portions of a road surface having different coefficient of friction and that one wheel is traveling on the road surface portion has a lower coefficient of friction, increasing of the braking force for the other front wheel which is in contact with the road surface portion having a higher friction coefficient can be suppressed by the intermittent closing operation of the solenoid valve 9a, and the generation of a yaw moment for the vehicle body can be also suppressed moderately.

Suppose that a high hydraulic pressure cannot be provided from the hydraulic pressure supply source 2 due to a trouble in the hydraulic pump 11 or the like during the above-described braking. In this case, the on-off valves $94_{FL}$, $94_{FR}$ and $94_R$ can be opened by a reduction in hydraulic pressure in the associated branch fluid passages $121_{FL}$, $121_{FR}$ and $121_R$ in accordance with a reduction in hydraulic pressure from the output port 37 of the supply source hydraulic pressure control means 4. Consequently, the hydraulic braking pressure developed in the first and second hydraulic pressure chambers 18 and 19 in the auxiliary hydraulic pressure generating means 3 can be applied directly to the brake devices $B_{FL}$ to $B_{RR}$, thereby insuring the braking force.

In this case, since the hydraulic pressure transmitting means $5_{FL}$ to $5_R$ are interposed between the brake devices $B_{FL}$ to $B_{RR}$ and the supply source hydraulic pressure control means 4, the braking force for the brake devices $B_{FL}$ to $B_{RR}$ cannot be escaped toward the supply source hydraulic pressure control means 4.

Moreover, the shut-off valve 55 is shut off by the reduction of the hydraulic pressure in the back pressure chamber 78 in response to an abnormal reduction in hydraulic pressure in the hydraulic pressure supply source 2, thereby cutting off the communication between the hydraulic pressure passage 53 and the accumulator 56. Therefore, it is avoided that an unnecessary reaction force by the accumulator 56 is applied to the brake pedal 1.

During non-braking after completion of the braking, the on-off valves $94_{FL}$, $94_{FR}$ and $94_R$ are first opened by the reduction of the hydraulic pressure in the branch fluid passages $121_{FL}$, $121_{FR}$ and $121_R$ in accordance with the reduction of output hydraulic pressure from the output port 37. Then, the fifth one-way valve 123 is opened as the differential pressure across the fifth one-way valve 123 becomes equal to or greater than the preset valve-opening pressure, whereby the respective input hydraulic pressure chambers 81 in the hydraulic pressure transmitting means $5_{FL}$ to $5_R$ are put into communication with the reservoir R through the supply source hydraulic pressure control means 4. This enables breathing of the output hydraulic pressure chambers 82 in response to the movement of the free pistons 83 in the hydraulic pressure transmitting means $5_{FL}$ to $5_R$ toward the input hydraulic pressure chambers 81. Moreover, the hydraulic pressure in the respective input hydraulic pressure chambers 81 in the hydraulic pressure transmitting means $5_{FL}$ to $5_R$ can be escaped into the output hydraulic pressure passage 89 through the hydraulic pressure-releasing one-way valves $90_{FL}$, $90_{FR}$ and $90_R$. Hence, the quick releasing of the hydraulic pressure in the input hydraulic pressure chambers 81 can be provided to quickly return the free pistons 83 to their original positions.

It can be supposed that the hydraulic pressure in the input hydraulic pressure chambers 81 may be increased by an increase in temperature in the individual hydraulic pressure transmitting means $5_{FL}$, $5_{FR}$ and $5_R$ during non-braking. In such a case, the braking force may be applied, if the hydraulic pressure cannot escape. However, since the preset pressure for opening the fifth one-way valve 123 is set at a relatively small level less than that for opening the fourth one-way valve 122, the fifth one-way valve 123 can be opened in response to the increasing of the hydraulic pressure in the input hydraulic pressure chambers 81 to escape an amount of the working fluid corresponding to the increment of the hydraulic pressure.

Further, when the driving force of the engine is too large, so that the drive wheels are likely to slip, the solenoid valves 9a and 9b of the traction controlling change-over control valve means 9 are both excited by the control means 91. This causes the hydraulic pressure from the hydraulic pressure supply source 2 to be applied to the input hydraulic pressure chambers 81 in the hydraulic pressure transmitting means $5_{FL}$ and $5_{FR}$, whereby the braking force is produced in the brake devices $B_{FL}$ and $B_{FR}$ for the left and right front driving wheels, thus avoiding the occurring of excessive slipping. Thereafter, it is possible to control the braking force by the controlling of the excitation and deexcitation of the flow-in solenoid valves $7_{FL}$ and $7_{FR}$ and the flow-out solenoid valves $8_{FL}$ and $8_{FR}$ in the same manner as during the above-described anti-lock control.

Furthermore, the output hydraulic pressure from the hydraulic pressure supply source 2 is set at a considerably large level, but such hydraulic pressure from the hydraulic pressure supply source 2 can be reduced to a level suitable to the control by the reducing valve 92 and hence, the traction control cannot be effected due to an excessive hydraulic pressure. Accordingly, the responsiveness of the control cannot be reduced nor non-smoothed.

In such a hydraulic braking pressure control system, the hydraulic pressure developed in the first hydraulic pressure chamber 18 in the auxiliary hydraulic pressure generating means 3 is reduced by the proportional reducing valve 54 and delivered into the first input pressure working chamber 51 in the supply source hydraulic pressure control means 4 and when the hydraulic pressure supply source 2 is in failure, hydraulic pressure is provided to the brake devices $B_{RL}$ and $B_{RR}$ through the on-off valve $94_R$ and the proportional reducing valve 6. The hydraulic pressure developed in the second hydraulic pressure chamber 19 is delivered into the second input pressure working chamber 52 in the supply source hydraulic pressure control means 4 and when the hydraulic pressure supply source 2 is in failure, hydraulic pressure is provided to the brake devices $B_{FL}$ and $B_{FR}$ through the on-off valves $94_{FL}$ and $94_{FR}$. Therefore, the first and second hydraulic pressure chambers 18 and 19 in the auxiliary hydraulic pressure generating means 3 have two functions, respectively, which contributes to a reduction in size of the auxiliary hydraulic pressure generating means 3.

It should be noted that the first and second input pressure working chambers 51 and 52 for exhibiting a hydraulic pressure for driving the spool 31 are provided in the supply source hydraulic pressure control means 4, and it is possible to drive the spool 31, even if the hydraulic pressure is applied to any of the input pressure working chambers 51 and 52. Thus, the supply source hydraulic pressure control means 4 can be driven to supply the braking pressure to the brake devices $B_{FL}$ to $B_{RL}$, even if any defect of hydraulic pressure should occur either between the first hydraulic pressure chamber 18 in the auxiliary hydraulic pressure generating means 3 and the first input pressure working chamber 51 or between the second hydraulic pressure chamber 19 and the second output pressure working chamber 52.

In another embodiment of the present invention, the relationship of connection of the first and second hydraulic pressure chambers 18 and 19 in the auxiliary hydraulic pressure generating means 3 with the chambers 51 and 52 may be reversed. In this case, the spring 22 is interposed between the first and second working pistons 16 and 17, and the spring force of the spring 22 may be set larger than that of the spring 23.

While the first housing 14 of the auxiliary hydraulic pressure generating means 3 and the second housing 30 of the supply source hydraulic pressure control means 4 have been constructed separately in the above embodiment, it will be understood that they may be integrally constructed.

What is claimed is:

1. A hydraulic braking pressure control system comprising an auxiliary hydraulic pressure generating means capable of generating a hydraulic pressure in accordance with the braking operation of a brake pedal, and a hydraulic pressure supply source hydraulic pressure control means, interposed between a hydraulic pressure supply source and a brake device, for controlling the hydraulic pressure from the hydraulic pressure supply source in accordance with the braking operation of the brake pedal, wherein said auxiliary hydraulic pressure generating means comprises a working piston which is slidably received in a first housing with a front surface of the working piston faced to a hydraulic pressure chamber and which is operatively connected to the brake pedal to advance in accordance with the braking operation of the brake pedal, and said hydraulic pressure supply source hydraulic pressure control means comprises a second housing having an output port connected to the brake device, an input port leading to the hydraulic pressure supply source, and a release port leading to a reservoir; a spool slidably received in the second housing to change-over the connection and disconnection of the output port with and from the input port and the release port by an axial movement of the spool; an input pressure working chamber defined in the second housing for exhibiting a hydraulic force for urging said spool in a direction to put the output port into communication with the input port; and an output pressure working chamber defined in the second housing and communicating with the output port to exhibit a hydraulic force in a direction to put the output port into communication with the release port, said hydraulic pressure chamber in said auxiliary hydraulic pressure generating means being connected to the input pressure working chamber in said supply source hydraulic pressure control means and also to the brake device through a hydraulic pressure regulating means which inhibits the flowing of a working oil from said hydraulic pressure chamber until the output hydraulic pressure from said hydraulic pressure chamber in the auxiliary hydraulic pressure generating means exceeds a preset pressure, and through an on-off valve adapted to be opened in response to a reduction in an output hydraulic pressure from said output port, said preset pressure for the hydraulic pressure regulating means being set at a value not less than a hydraulic pressure in the input pressure working chamber which is required for the supply source hydraulic pressure control means to be operated until the on off valve can be closed by the output hydraulic pressure from the output port.

2. A hydraulic braking pressure control system according to claim 1, wherein said hydraulic pressure regulating means comprises a first one-way valve for permitting only the flowing of the working oil from the hydraulic pressure chamber toward the on off valve as the output hydraulic pressure in said hydraulic pressure chamber in the auxiliary hydraulic pressure generating means exceeds the preset pressure, and a second one-way valve connected in parallel to the first one-way valve to permit only the flowing of the working oil from the on-off valve toward the hydraulic pressure chamber in the auxiliary hydraulic pressure generating means, and said auxiliary hydraulic pressure generating means is constructed such that the hydraulic pressure chamber is put into communication with the reservoir during a non-braking operation.

3. A hydraulic braking pressure control system according to claim 2, further including a third one-way valve interposed between said hydraulic pressure regulating means as well as the on-off valve and said reservoir for permitting only the flowing of the working oil from the side of said reservoir.

4. A hydraulic braking pressure control system according to claim 3, further including a bar-like receiver which is fixedly disposed in a cylindrical casing closed at opposite ends thereof to define, between the receiver and opposite ends of the casing, a first oil chamber leading to the hydraulic pressure chamber in the auxiliary hydraulic pressure chamber and a second oil chamber leading to the reservoir and to define, between the receiver and an inner surface of the casing, an annular third oil chamber leading to the on-off valve, said receiver having a cup seal fitted in an outer periphery of the receiver serving as the second one-way valve which is adapted to repulsively come into contact with the inner surface of the casing to establish and interrupt communication between the first and third oil chambers, and a further cup seal fitted in an outer periphery of the receiver as the third one-way valve which is adapted to repulsively come into contact with the inner surface of the casing to establish and interrupt communication between the third and second oil chambers, said first one-way valve being disposed midway of a passage provided in said receiver to interconnect the first and second oil chambers.

5. A hydraulic braking pressure control system comprising:
- a brake device;
- a brake pedal;
- auxiliary hydraulic pressure generating means, connected to said brake device, for generating a hydraulic pressure depending upon a braking operation by said brake pedal;
- a hydraulic pressure supply source;
- hydraulic pressure supply source hydraulic pressure control means for controlling the hydraulic pressure from said hydraulic pressure supply source in accordance with the braking operation by said brake pedal;
- hydraulic pressure transmitting means, interposed in a hydraulic pressure path extending from said hydraulic pressure supply source via said hydraulic pressure supply source hydraulic pressure control means to said brake device, said hydraulic pressure transmitting means for permitting a transmission of the hydraulic pressure output from said hydraulic pressure supply source hydraulic pressure control means to said brake device when the hydraulic pressure in said hydraulic pressure supply source is normal and for cutting off a flow of a working fluid from said brake device toward said hydraulic pressure supply source when the hydraulic pressure in said hydraulic pressure supply source is abnormally reduced;
- an on-off valve, interposed between said auxiliary hydraulic pressure generating means and said brake device, said on-off valve having a pilot chamber leading to an output port of said hydraulic pressure supply source hydraulic pressure control means, and said on-off valve to be closed in response to an increase in the hydraulic pressure in said pilot chamber; and
- hydraulic pressure regulating means, interposed between said auxiliary hydraulic pressure generating means and said on-off valve for inhibiting the transmission of hydraulic pressure from the auxiliary hydraulic pressure generating means to the on-off valve until the hydraulic pressure generated by the auxiliary hydraulic pressure generating means exceeds a preset pressure.

6. A hydraulic braking pressure control system according to claim 5, wherein said hydraulic pressure regulating means includes a first one-way valve for permitting only the transmission of hydraulic pressure from the auxiliary hydraulic pressure generating means toward the on-off valve as the hydraulic pressure exceeds the preset pressure, and a second-on way valve connected in parallel to the first one-way valve to permit only the transmission of hydraulic pressure from the on-off valve toward the auxiliary hydraulic pressure generating means, and wherein said auxiliary hydraulic pressure generating means includes a hydraulic pressure chamber which generates said hydraulic pressure during braking and which is put into communication with a reservoir during non-braking.

7. A hydraulic braking pressure control system according to claim 6, further comprising a third one-way valve interposed between said first and second one-way valves and the one-off valve and said reservoir permitting only the transmission of the hydraulic pressure from the side of said reservoir.

8. A hydraulic braking pressure control system according to claim 7, wherein said hydraulic pressure regulating means includes a bar-like receiver which is fixedly disposed in a cylindrical casing closed at opposite ends thereof, between the bar-like receiver and opposite ends of the casing is located a first fluid chamber leading to the hydraulic pressure chamber in the auxiliary hydraulic pressure generating means and a second fluid chamber leading to the reservoir and, between the bar-like receiver and an inner surface of the casing is located an annular third fluid chamber leading to the on-off valve, said bar-like receiver having a cup seal fitted in an outer periphery of the bar-like receiver serving as the second one-way valve which is to repulsively come into contact with the inner surface of the casing to establish and interrupt communication between the first and third fluid chambers and a further cup seal fitted in an outer periphery of the receiver as the third one-way valve which is to repulsively come into contact with the inner surface of the casing to establish and interrupt communication between the third and second fluid chambers, said first one-way valve being disposed midway of a passage provided in said receiver to interconnect the first and third fluid chambers.

9. A hydraulic braking pressure control system according to claim 5, wherein said hydraulic pressure supply source hydraulic pressure control means is operated by the hydraulic pressure generated from the auxiliary hydraulic pressure generating means.

10. A hydraulic braking pressure control system according to claims 5 or 9, wherein the hydraulic pressure generated from the auxiliary hydraulic pressure generating means is input to said hydraulic pressure supply source hydraulic pressure control means for operation thereof without passing through the hydraulic pressure regulating means.

11. A hydraulic braking pressure control system according to any of claims 5, 6, 7, 8 or 9, wherein said preset pressure is determined at a level no less than a level of the hydraulic pressure required to operation said hydraulic pressure supply source hydraulic pressure control means until the on-off valve can be closed by the hydraulic pressure from the output port of the hydraulic pressure supply source hydraulic pressure control means.

* * * * *

UNITED STATES PATENT AND TRADEMARK OFFICE
CERTIFICATE OF CORRECTION

PATENT NO.   :   5,106,170
DATED        :   April 21, 1992
INVENTOR(S)  :   Shohei MATSUDA et al It is certified that error appears in the above-identified patent and that said Letters Patent is hereby corrected as shown below:

On the cover page, Item [75], second line, "Ysuyoshi Satoh" should read -- Tsuyoshi SATOH --.

Signed and Sealed this

Twentieth Day of July, 1993

Attest:

MICHAEL K. KIRK

Attesting Officer

Acting Commissioner of Patents and Trademarks